(12) United States Patent
Morgenstern

(10) Patent No.: US 10,893,584 B2
(45) Date of Patent: Jan. 12, 2021

(54) SYSTEMS AND METHODS FOR VOLTAGE INTERFACES BETWEEN LEGACY CONTROL SYSTEMS AND LIGHT SOURCES

(71) Applicant: Fluence Bioengineering, Inc., Austin, TX (US)

(72) Inventor: Paul Morgenstern, Austin, TX (US)

(73) Assignee: Fluence Bioengineering, Inc., Austin, TX (US)

(*) Notice: Subject to any disclaimer, the term of this patent is extended or adjusted under 35 U.S.C. 154(b) by 0 days.

(21) Appl. No.: 16/802,777

(22) Filed: Feb. 27, 2020

(65) Prior Publication Data

US 2020/0205256 A1  Jun. 25, 2020

Related U.S. Application Data

(63) Continuation of application No. 16/208,690, filed on Dec. 4, 2018.

(60) Provisional application No. 62/596,890, filed on Dec. 10, 2017.

(51) Int. Cl.
*H05B 45/00* (2020.01)
*H05B 45/40* (2020.01)
*A01G 7/04* (2006.01)

(52) U.S. Cl.
CPC .............. *H05B 45/00* (2020.01); *H05B 45/40* (2020.01); *A01G 7/045* (2013.01)

(58) Field of Classification Search
CPC ............ H05B 41/2828; H05B 41/2851; H05B 41/3921; H05B 45/22; H05B 45/24; H05B 45/28; H05B 45/37; H05B 45/46; H05B 45/48; H05B 45/56; H05B 39/042; H05B 41/3922; H05B 45/00; H05B 45/40
See application file for complete search history.

(56) References Cited

U.S. PATENT DOCUMENTS

2012/0306370 A1* 12/2012 Van De Ven .......... H05B 45/28
                                                                   315/113
2018/0219519 A1*  8/2018 Schober ................ H03F 3/3022

* cited by examiner

*Primary Examiner* — Monica C King
(74) *Attorney, Agent, or Firm* — Yutian Ling

(57) ABSTRACT

Examples of the present disclosure are related to systems and methods for voltage interfaces between legacy control systems and light sources. An example voltage interface may include a control loop including a first op-amp, an output loop including a second op-amp, and an optical isolator configured to electrically isolate the control loop from the output loop, the optical isolator being configured to receive an input signal from the control loop and transmit an output signal to the output loop.

18 Claims, 3 Drawing Sheets

SYSTEMS AND METHODS FOR VOLTAGE INTERFACES BETWEEN LEGACY CONTROL SYSTEMS AND LIGHT SOURCES

CROSS-REFERENCE TO RELATED APPLICATIONS

This application is a continuation of U.S. patent application Ser. No. 16/208,690, filed Dec. 4, 2018, entitled "Systems and Methods for Voltage Interfaces between Legacy Control Systems and Light Sources," which claims a benefit of priority under 35 U.S.C. § 119 to U.S. Provisional Application No. 62/596,890 filed on Dec. 10, 2017, each of which is fully incorporated herein by reference in their entirety.

BACKGROUND INFORMATION

Field of the Disclosure

Examples of the present disclosure are related to systems and methods for voltage interfaces between legacy control systems and light sources. More specifically, implementations are directed towards a voltage interface that is configured to output milliamps in a sinking or sourcing configuration to multiple outputs, wherein different channels associated with the voltage interface have isolated inputs and outputs.

Background

With the proliferation of LED lighting systems, controls for the lighting systems have become more important. Specifically, many lighting systems implement dimmers to increase or decrease light intensity from the light sources. For example, in the greenhouse industry, light sources must be dimmed for proper plant growth.

However, in industrial settings for different industries, different methods to control light dimming may conflict. This leads to unstable or substandard light dimming. In the greenhouse industry, often a 10 v power source is used to control pumps, HVAC, LED lighting fixtures, and other systems. Yet, this voltage cannot be regulated or controlled when supplied to the various elements. Further, in the greenhouse industry, a controller generating the 10 v is typically a current source that is connected to a high impedance load. The current that the controller supplies is often less than 10 milliamps, and the controller typically only sinks approximately 10 milliamps. However, elements in the greenhouse industry typically require substantially higher current.

When coupling multiple light fixtures together with higher currents, the circuits connected in parallel behave erratically. This leads to the light fixtures developing current flow between the fixtures themselves, and also the controller. This leads to the circuits being shorted, which ruins the circuits.

Accordingly, needs exist for more effective and efficient systems and methods for an interface with legacy control systems to be used within LED fixtures.

SUMMARY

Implementations disclose systems and methods for voltage interfaces between legacy control systems and light sources. More specifically, implementations disclose a voltage interface that is configured to position between a legacy control systems supplying 0 to 10 v and light sources, wherein the interface is configured to control the current supplied to dim light fixtures. The elements within the voltage interface may be configured to be electronically isolated from each other using an optical isolator. By isolating the components the interface, implementations may limit catastrophic failures by controlling situations in which voltage or current waves may be transmitted to the legacy control systems.

Implementations may include a legacy control system, light sources, and an interface.

The legacy control system may be a power source that is configured to supply 0-10 volts to the interface. For example, the power source may provide zero volts to the interface in a sinking configuration, or provide ten volts to the interface in a sourcing configuration. The legacy control system may be configured to supply the voltage and current in DC.

The light sources may be an artificial light source that is configured to stimulate plant growth by emitting light. For example, the light sources may be LEDs. The light sources may be utilized to create light or supplement natural light to the area of interest. The light sources may provide a light spectrum that is similar to the sun, or provide a spectrum that is tailored to the needs of particular pants being cultivated.

The interface may be configured to receive the voltage from the legacy control system, and output a voltage with a desired level of milliamps to the light sources, wherein the interface may operate in either a sinking configuration or in a sourcing configuration. In implementations, the interface may be coupled with multiple inputs and/or outputs, wherein each of the inputs is isolated from each other and each of the outputs is isolated from each other.

The interface may include a first op-amp and a second op-amp positioned in series, and an optical isolator positioned between the first op-amp and the second op-amp. The first op-amp may be configured to operate as a power device, and be a voltage follower, which has high input impedance and low output impedance. The first op-amp may be connected to a first power source having at least twelve volts and a first ground.

The second op-amp may a voltage follower amp, which is configured to receive an input from the first op-amp, and output a voltage with a high current, wherein the output current may be at least 750 milliamps. In some implementations, the second op-amp may be connected to a second power source and a second ground. The second op-amp may be configured to have multiple output channels, wherein each output channel may individually receive at least 750 milliamps. The channels may be configured to control different groups of light fixtures, wherein the light sources on each channel may be independently controlled with different dimming characteristics.

The optical isolator may include photo diodes that are configured to electrically isolate the first op-amp from the second op-amp.

These, and other, aspects of the invention will be better appreciated and understood when considered in conjunction with the following description and the accompanying drawings. The following description, while indicating various implementations of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

Non-limiting and non-exhaustive implementations of the present invention are described with reference to the following figures, wherein like reference numerals refer to like parts throughout the various views unless otherwise specified.

Figure 1:
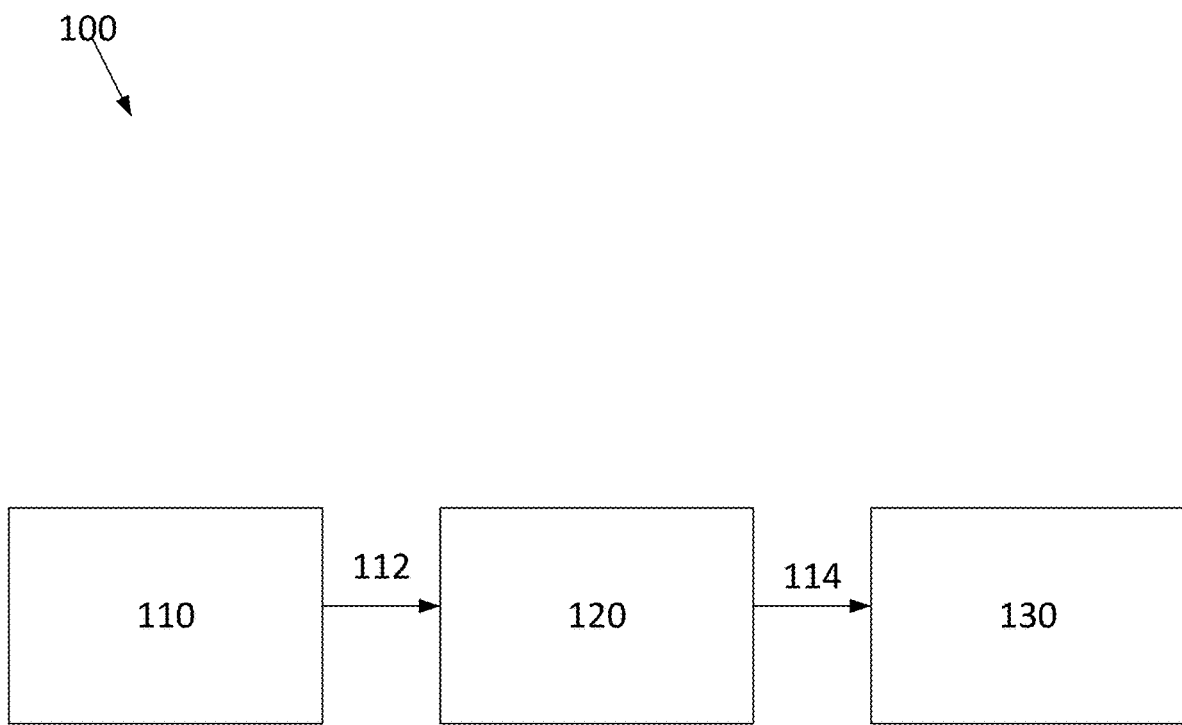
FIG. 1 depicts a system for a voltage interface, according to an implementation.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help improve understanding of various implementations of the present disclosure. Also, common but well-understood elements that are useful or necessary in a commercially feasible implementation are often not depicted in order to facilitate a less obstructed view of these various implementations of the present disclosure.

DETAILED DESCRIPTION

In the following description, numerous specific details are set forth in order to provide a thorough understanding of the present implementations. It will be apparent, however, to one having ordinary skill in the art that the specific detail need not be employed to practice the present implementations. In other instances, well-known materials or methods have not been described in detail in order to avoid obscuring the present implementations.

FIG. 1 depicts a system 100 for a voltage interface, according to an implementation. As depicted in FIG. 1, system 100 may include a legacy control system 110, interface 120, and light sources 130.

Legacy control system 110 may be a power source that is configured to supply 0-10 volts to the interface. For example, the legacy control system 110 may provide zero volts to the interface in a sinking configuration, or provide ten volts to the interface in a sourcing configuration. Legacy control system 110 may be configured to supply the voltage and current in DC.

Interface 120 may include an input 112, and an output 114. Interface 120 may be configured to output a higher current to light sources 130 on a plurality of different independent channels, which allows the independent light sources 130 to be independently controlled. Interface 120 may be configured to operate in either a sinking configuration or in a sourcing configuration. Input 112 may be configured to receive the voltage from legacy control system 110. Output 114 may be configured output a voltage with desired level of milliamps to the light sources 130. In implementations, input 112 may be electrically isolated from output 114. Output 114 may include a plurality of channels, which is each configured to independently control a different light source grouping. In implementations, the interface 120 may be coupled with multiple inputs 112 and/or outputs 114, wherein each of the inputs 112 and outputs 112 may be electronically isolated from each other using different power supplies and grounds. Interface 120 may also include an optical isolator, which is configured to electronically isolate the first op-amp from the second op-amp.

Light sources 130 may be artificial light sources that are configured to stimulate plant growth by emitting light. For example, light sources 130 may be LEDs. Light sources 130 may be utilized to create light or supplement natural light to the area of interest. Light sources 130 may provide a light spectrum that is similar to the sun, or provide a spectrum that is tailored to the needs of particular pants being cultivated. Implementations may include a plurality of different light sources 130, which are individually grouped. The different groups of light sources 130 may have different loads, and can also have characteristics that are independently controlled via interface 120. Additionally, the different groupings of light sources 130 may have different numbers of LEDs, which may lead to the different groupings of light sources 130 having different loads. The different groupings of light sources 130 may each be connected to a different channel on output 114. The channels may be configured to control different light source 130 groups, wherein the light sources 130 on each channel may be independently controlled with different dimming characteristics.

Figure 2:
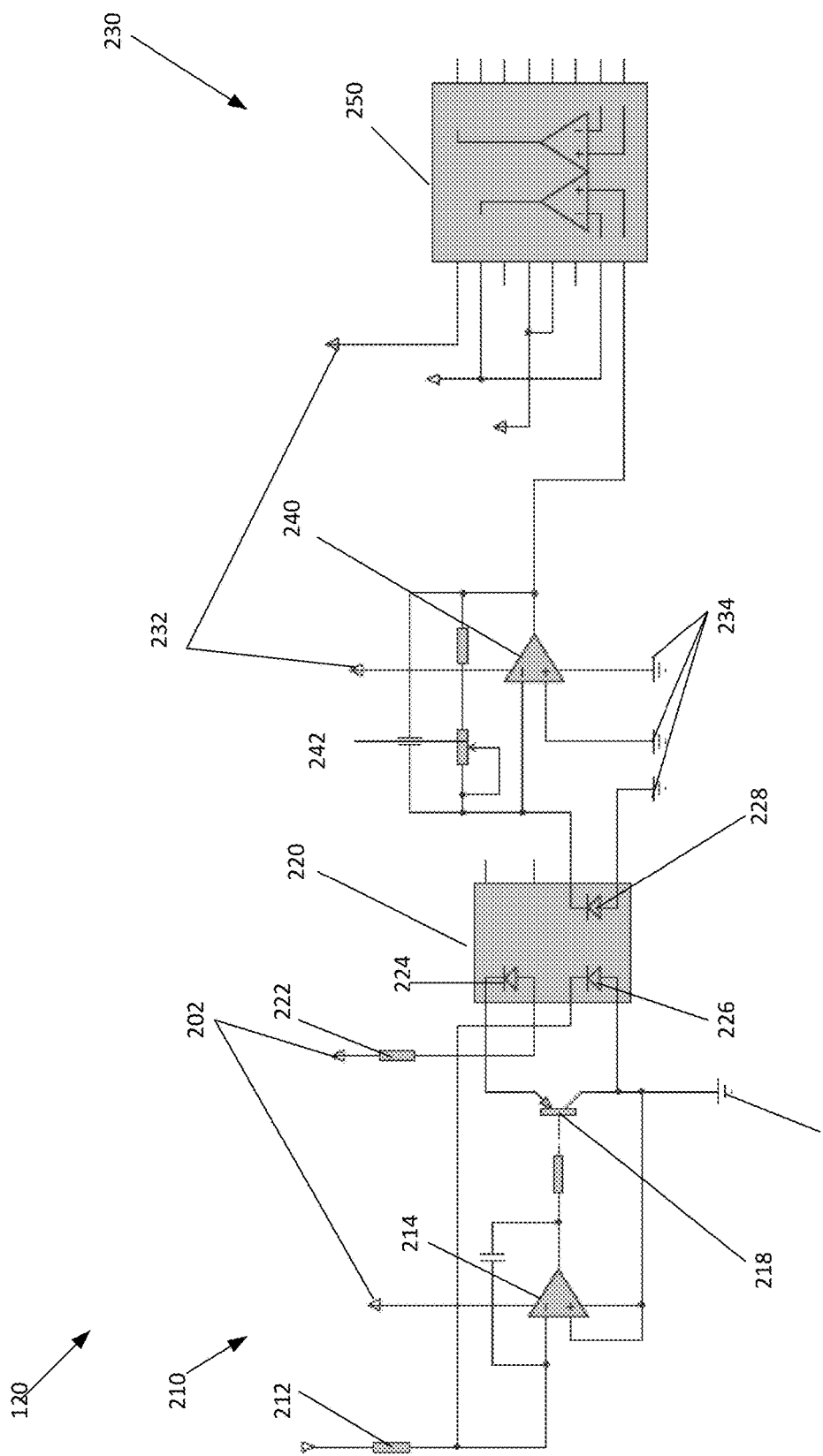
FIG. 2 depicts a detailed view of an interface, according to an implementation.

FIG. 2 depicts a detailed view of interface 120, according to an implementation.

As depicted in FIG. 2, interface 120 may include a control loop 210, isolator 220, and output loop 230.

Control loop 210 may include a first power source 202, a first ground 204, first resistor 212, first op-amp 214, and first transistor 218.

First power source 202 may be configured to supply power to elements within control loop 210 and isolator 220. First power source 202 may be configured to be electrically isolated from elements within output loop 230.

First ground 204 may be a reference point within first control loop 210 where voltages are measured. Elements within control loop 210 may be electrically coupled to first ground 204. However, elements within output loop 230 may not be electrically coupled to first ground 204.

First resistor 212 may be configured to limit the voltage from legacy control system applied to op-amp 214.

First op-amp 214 may be configured to produce an output potential that is greater than the potential difference between its input terminals. First op-amp 214 may be configured to receive power from first power source 202, and be coupled to first ground 204.

First transistor 218 maybe configured to be coupled with isolator 220, first op-amp 214, and first ground 204 to form a servo-loop. The servo loop may be configured to accurately supply a desired voltage to isolator 220.

Isolator 220 may be a device that is configured to prevent unwanted feedback from output loop 230 interacting with control loop 210. Isolator 220 may be configured to have inputs electrically isolated from the output of Isolator 220. In implementations, isolator 220 may be an optical isolator, magnetic isolator, capacitive isolator, or any other type of isolator that is configured to electronically separate a first circuit from a second circuit. Isolator 220 may include a second resistor 222, first light emitting diode 224, first photo diode 226, and second photo diode 228.

Second resistor 222 may be a device that is configured to be coupled with first power source 202 and first light emitting diode 224. Second resistor 222 may be configured to limit a current applied to first light emitting diode 224.

First light emitting diode 224 may be configured to transmit light, wherein the transmitted light may be measured by first photo diode 226 and second photo diode 228. In implementations, first photo diode 226 and second photo diode 228 may be the same components that are configured to similarly measure the light transmitted by first light emitting diode 224.

First photo diode 226 may be utilized by first transistor 218 to form the servo-loop. First photo diode 226 may be a closed control loop that is formed along with first transistor 218. The closed control loop allows for a correlation between the voltage provided to the light emitting diode 224 and the light intensity emitted by first light emitting diode 224. This may allow the control loop 110 to regulate the light emitted by first light emitting diode 224 to achieve a desired intensity.

Second photo diode 228 may be configured to measure the light emitted by light emitting diode 224, and to supply power to output loop 230. Further, second photo diode 228 is configured to operate as a light barrier between control loop 210 and output loop 230, which are not electrically coupled together. In implementations, a voltage associated with the light measured by second photodiode 228 may be configured to output to output loop 230.

Output loop 230 may be configured to supply power to a series of light fixtures, while also limiting current from impacting isolator 220. Output loop 230 may include a second power supply 232, a second ground 234, second op-amp 240, and driver module 250.

Second power supply 232 may be configured to supply power to elements within output loop 230. Second power supply 232 may be configured to be electrically isolated from elements within control loop 210.

Second ground 234 may be a reference point within output loop 230 where voltages are measured. Elements within second output loop 230 may be electrically coupled to second ground 234. However, elements within output loop 230 may not be electrically coupled to first ground 204.

Second op-amp 240 may be configured to operate as a buffer. Specifically, second op-amp 240 may be configured to amplify the signal from the isolator 220. In implementations, second op-amp 240 may utilize resistors 242 positioned in series that are configured to be feedback resistors. The feedback resistors 242 may be configured to calibrate the output of second op-amp 240 with the input applied to the first resistor 212, such that voltage applied to first resistor 212 is similar to that output from second op-amp 240. By controlling the voltage applied to the first resistor 212, implementations may be utilized to dim or control an intensity of light emitted from a plurality of light sources connected to the output loop 230.

Driver module 250 may be an op-amp that is configured to output voltages with very high current, such as one amp. The output with a very high current may be utilized to drive a group of light fixtures. In implementations, the group of light fixtures may include up to fifty or more light fixtures. Driver module 250 may be configured to be coupled with second power supply 232 and second ground 234, while receiving an input from second op-amp 240.

In further implementations, a plurality of output loops 230 may be coupled to isolator 220, wherein each of the output loops is associated with a different channel. Each of the plurality of output loops 230 may have isolated and independent grounds and power supplies.

Figure 3:
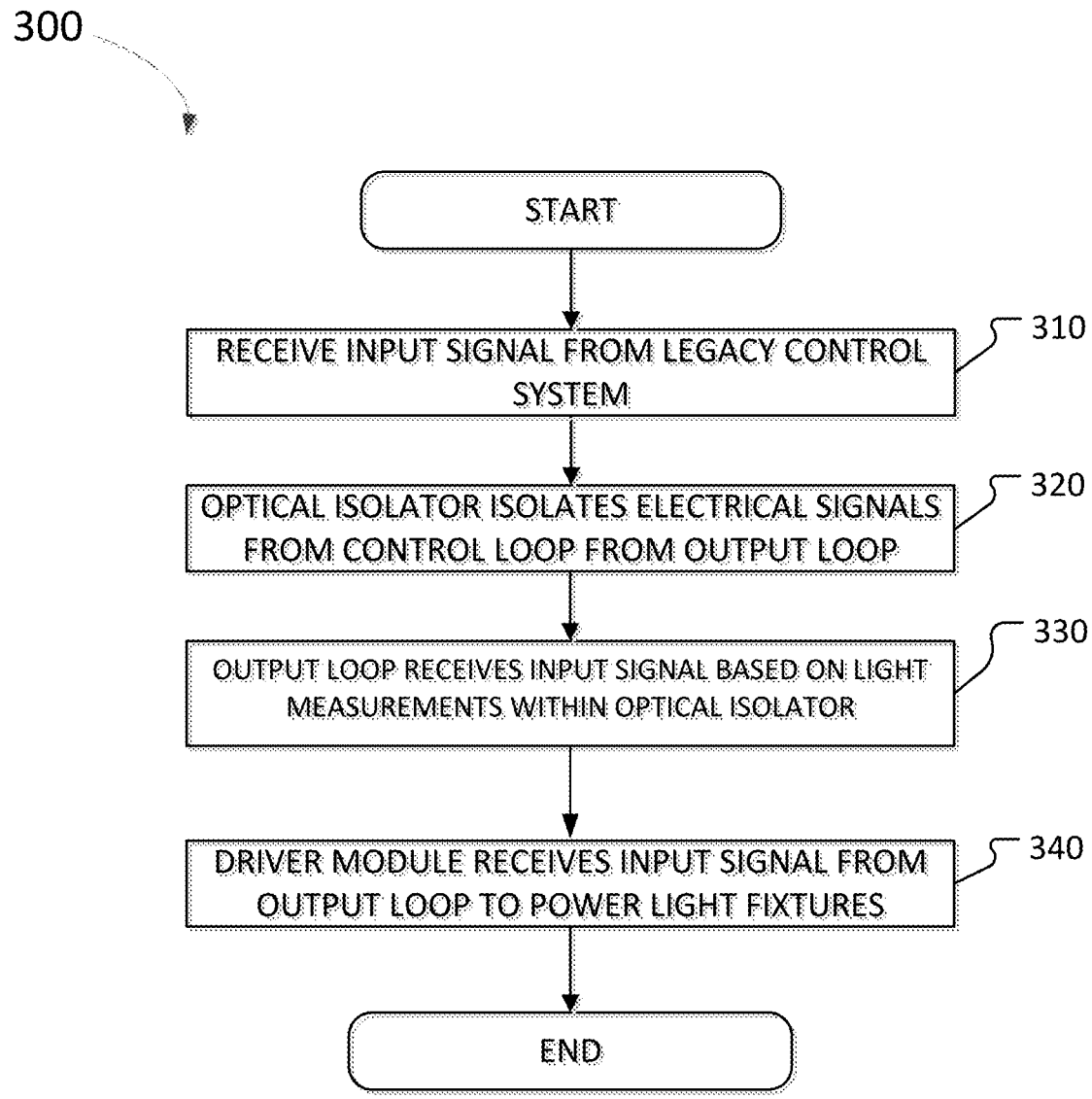
FIG. 3 illustrates a method for utilizing an interface positioned between lighting sources and a legacy control system to control lighting characteristics of the lighting sources, according to an implementation.

FIG. 3 illustrates a method 300 for utilizing an interface positioned between lighting sources and a legacy control system to control lighting characteristics of the lighting sources, according to an implementation. The operations of method 300 presented below are intended to be illustrative. In some implementations, method 300 may be accomplished with one or more additional operations not described, and/or without one or more of the operations discussed. Additionally, the order in which the operations of method 300 are illustrated in FIG. 3 and described below is not intended to be limiting. The method 300 may be performed by a voltage interface, such as interface 120 in FIG. 1.

At operation 310, a control loop or control signal of the interface may be configured to receive an input configured to adjust the lighting characteristics of lighting sources. The input may be received from a legacy control system, which may be a power source that supplies between 0-10 volts. Electrical elements within the control loop may be configured to be coupled to a first power supply and a first ground.

At operation 320, an optical isolator is configured receive an input from the control loop, and output a signal to an output loop. The optical isolator may form a light barrier between the control loop and an output loop, wherein the light barrier is configured to electrically isolate elements within the control loop and elements within the output loop. The output emitted from the optical isolator may be based on a received signal powering a light emitting diode on a first side of the light barrier, and a photodiode on a second side of the light barrier measuring the emitted light.

At operation 330, the output loop may receive an input based on the measurements of the photodiode on the second side of the light barrier in the optical isolator. In implementations, electrical elements positioned within the output loop may be coupled to a second power supply and a second ground, which are electrically isolated from the first power supply and the first ground.

At operation 340, a driver module may be configured may be configured to receive an input signal from the output loop and power a plurality of end-user devices, such as lighting fixtures. The output loop may include one or more independent outputs, each output having a driver module that is associated with a group of light sources, so that the output loop may independently control multiple groups of lights.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

Reference throughout this specification to "one implementation", "an implementation", "one example" or "an example" means that a particular feature, structure or characteristic described in connection with the implementation or example is included in at least one implementation of the present invention. Thus, appearances of the phrases "in one implementation", "in an implementation", "one example" or "an example" in various places throughout this specification are not necessarily all referring to the same implementation or example. Furthermore, the particular features, structures or characteristics may be combined in any suitable combinations and/or sub-combinations in one or more implementations or examples. In addition, it is appreciated that the figures provided herewith are for explanation purposes to persons ordinarily skilled in the art and that the drawings are not necessarily drawn to scale.

The flowcharts and block diagrams in the flow diagrams illustrate the architecture, functionality, and operation of possible implementations of systems, methods, and computer program products according to various implementations of the present invention. In this regard, each block in the flowcharts or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

What is claimed is:

1. A system for controlling a plurality of light fixtures, the system comprising:
    a control loop including a first op-amp configured to receive power from a first power source and to be coupled to a first ground;
    an output loop including a second op-amp configured to receive power from a second power source and to be coupled to a second ground, wherein the first power source and the second power source are electrically isolated from each other and the first ground and the second ground are electrically isolated from each other; and
    an optical isolator configured to electrically isolate the control loop from the output loop, the optical isolator being configured to receive an input signal from the control loop and transmit an output signal to the output loop,
    wherein the first power source and the second power source are configured to supply a same voltage.

2. The system of claim 1, wherein the optical isolator is configured to be coupled with the first power source and the first ground.

3. The system of claim 1, wherein the optical isolator includes a light emitting diode, a first photodiode and a second photodiode, the light emitting diode and the first photodiode being electrically coupled to the control loop, and the second photodiode being electrically coupled to the output loop.

4. The system of claim 3, wherein the first photodiode and the second photodiode are configured to measure an amount of light emitted by the light emitting diode.

5. The system of claim 3, wherein the first photo diode is configured to form a closed control loop with a first transistor.

6. The system of claim 1, wherein the output loop includes one or more independent outputs, including a first output electrically coupled to a driver module configured to output a signal with at least one amp of current.

7. The system of claim 6, wherein the driver module is electrically coupled to the second power source.

8. The system of claim 6, wherein the driver module is coupled to a first group of light fixtures, and the driver module is configured to output the signal to the group of light fixtures.

9. The system of claim 1, wherein the control loop is configured to receive an input from a power source that supplies between zero and ten volts.

10. A method for controlling a plurality of light fixtures, the method comprising:
    coupling first electrical elements within a control loop to a first power source and a first ground, the control loop including a first op-amp;
    coupling second electrical elements within an output loop to a second power source and a second ground, the output loop including a second op-amp, wherein the first power source and the second power source are electrically isolated from each other and the first ground and the second ground are electrically isolated from each other; and
    electrically isolating the control loop and the output loop with an optical isolator, the optical isolator being configured to receive an input signal from the control loop and transmit an output signal to the output loop,
    wherein the first power source and the second power source are configured to supply a same voltage.

11. The method of claim 10, further comprising:
    coupling the optical isolator with the first power source and the first ground.

12. The method of claim 10, wherein the optical isolator includes a light emitting diode, a first photodiode and a second photodiode, the light emitting diode and the first photodiode being electrically coupled to the control loop, and the second photodiode being electrically coupled to the output loop.

13. The method of claim 12, further comprising:
    measuring, via the first photodiode and the second photodiode, an amount of light emitted by the light emitting diode.

14. The method of claim 12, further comprising:
    forming a closed control loop with the first photo diode and a first transistor.

15. The method of claim 10, wherein the output loop includes one or more independent outputs, including a first output electrically coupled to a driver module configured to output a signal with at least one amp of current.

16. The method of claim 15, further comprising:
    coupling the driver module to the second power source.

17. The method of claim 15, further comprising:
    coupling the driver module to a first group of light fixtures, and
    outputting the signal to the group of light fixtures.

18. The method of claim 10, further comprising:
    receiving, by the control loop, an input from a power source that supplies between zero and ten volts.

* * * * *